United States Patent Office.

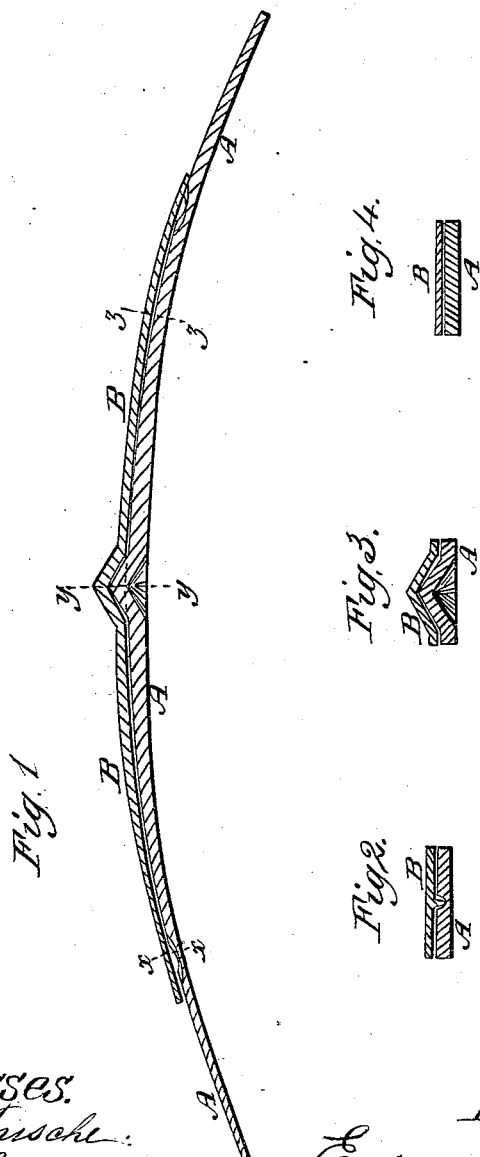

EDWARD C. LEWIS, OF AUBURN, NEW YORK.

Letters Patent No. 68,217, dated August 27, 1867.

---

IMPROVEMENT IN ELLIPTIC SPRINGS.

---

*The Schedule referred to in these Letters Patent and making part of the same.*

---

TO ALL WHOM IT MAY CONCERN:

Be it known that I, EDWARD C. LEWIS, of Auburn, in the county of Cayuga, and State of New York, have invented a new and useful Improvement in Springs; and I do hereby declare that the following is a full, clear and exact description thereof, which will enable others skilled in the art to make and use the same, reference being had to the accompanying drawings, forming part of this specification, in which—

Figure 1 is a longitudinal central section of my improved spring.

Figure 2 is a cross-section of the same, taken through the line $x\,x$, fig. 1.

Figure 3 is a cross-section of the same, taken through the line $y\,y$, fig. 1.

Figure 4 is a cross-section of the same, taken through the line $z\,z$, fig. 1.

Similar letters of reference indicate like parts.

My invention has for its object to furnish an improved manner of centring the leaves of springs and keeping the ends of the outer leaves in place upon the inner ones; and it consists in forming the springs with the centre of each leaf struck up so as to be convex upon the outer side and concave upon the inner side, and with nibs formed upon the inner side of each leaf near its ends, fitting into and working in a crease formed upon the outer side of each inner leaf, as hereinafter more fully described.

Fig. 1 represents a spring of two leaves, A and B, the centres of each of which are struck up, as shown in figs. 1 and 3, so as to be convex upon the outer side and concave upon the inner side, the concavity of the one spring fitting upon the convexity of the other one, so as to centre the leaves exactly. If desired, this striking up may be continued so as to form a hole through the centre of the leaves, surrounded with a flange convex upon its outer and concave upon its inner side, through which the clip-bolt, or any other desired bolt, may be passed. The ends of the leaves are kept from lateral displacement by having a nib formed upon the inner side of each upper leaf, near each of its ends, fitting into a crease or groove formed upon the outer side of each lower leaf for its reception. These nibs and creases or grooves are formed in the leaves of the spring without having any corresponding depression or projection upon the other side, as shown in figs. 1 and 2.

I claim as new, and desire to secure by Letters Patent—

The nibs formed upon the inner sides of the ends of the leaf B, fitting into the grooves upon the upper side of the leaf A in such a manner as to keep the leaves in line with each other, and preventing their lateral displacement, said nibs and grooves formed without having any corresponding depression or projection upon their opposite sides of the leaves, as herein described for the purpose specified.

EDWARD C. LEWIS.

Witnesses:
A. A. LEWIS,
HORACE T. COOK.